(12) United States Patent
Fu et al.

(10) Patent No.: US 12,258,487 B2
(45) Date of Patent: Mar. 25, 2025

(54) DUAL CURE COMPOSITION

(71) Applicant: Dow Silicones Corporation, Midland, MI (US)

(72) Inventors: Peng-Fei Fu, Midland, MI (US); Yanhu Wei, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 459 days.

(21) Appl. No.: 17/774,941

(22) PCT Filed: Jan. 5, 2021

(86) PCT No.: PCT/US2021/012136
§ 371 (c)(1),
(2) Date: May 6, 2022

(87) PCT Pub. No.: WO2021/150364
PCT Pub. Date: Jul. 29, 2021

(65) Prior Publication Data
US 2022/0396669 A1    Dec. 15, 2022

Related U.S. Application Data

(60) Provisional application No. 62/964,249, filed on Jan. 22, 2020.

(51) Int. Cl.
| | | |
|---|---|---|
| C09D 183/06 | (2006.01) | |
| C08G 77/16 | (2006.01) | |
| C08G 77/18 | (2006.01) | |
| C08K 5/00 | (2006.01) | |
| C08L 83/06 | (2006.01) | |
| C09J 183/04 | (2006.01) | |
| C09J 183/06 | (2006.01) | |

(52) U.S. Cl.
CPC ........... *C09D 183/06* (2013.01); *C08G 77/16* (2013.01); *C08G 77/18* (2013.01); *C08K 5/0025* (2013.01); *C08L 83/06* (2013.01); *C09J 183/04* (2013.01); *C09J 183/06* (2013.01)

(58) Field of Classification Search
CPC ................................ C08G 77/14; C08G 77/18
See application file for complete search history.

(56) References Cited

U.S. PATENT DOCUMENTS

| | | | |
|---|---|---|---|
| 4,699,802 A | 10/1987 | Nakos et al. | |
| 4,824,875 A | 4/1989 | Gutek | |
| 5,516,812 A | 5/1996 | Chu et al. | |
| 5,837,784 A | 11/1998 | Vincent | |
| 6,451,870 B1 | 9/2002 | DeCato et al. | |
| 8,367,212 B2 | 2/2013 | Irifune | |
| 9,976,041 B2 | 5/2018 | Fu et al. | |
| 2009/0091045 A1* | 4/2009 | Tanikawa | C08G 59/42 525/474 |
| 2010/0069523 A1 | 3/2010 | Alvarez et al. | |
| 2014/0154626 A1 | 6/2014 | Bujalski et al. | |
| 2016/0289388 A1 | 10/2016 | Fu et al. | |
| 2020/0278611 A1* | 9/2020 | Su | G03F 7/0757 |

FOREIGN PATENT DOCUMENTS

| | | |
|---|---|---|
| EP | 315341 A2 | 5/1989 |
| EP | 1231241 A1 | 8/2002 |
| WO | 199735924 A1 | 10/1997 |

* cited by examiner

*Primary Examiner* — Marc S Zimmer
(74) *Attorney, Agent, or Firm* — Steven W. Mork

(57) ABSTRACT

A composition containing: (a) a polysiloxane resin, wherein the polysiloxane resin contains the following siloxane units: $[R_3SiO_{1/2}]$, $[(OZ)_qSiO_{(4-q)/2}]$ and at least one of $[(OZ)_tR^{EP}SiO_{(3-t)/2}]$ and $[(OZ)_dRR^{EP}SiO_{(2-d)/2}]$; where: each R is independently in each occurrence selected from hydrocarbyls, $R^{EP}$ is an epoxy functional hydrocarbyl group, subscript q is in each occurrence a number selected from a range of 0-3, subscript t is in each occurrence a number selected from a range of 0-2, and subscript d is in each occurrence a number selected from a range of 0-1 provided that the average concentration of OZ groups is at least 15 mole-percent relative to moles of silicon atoms in the polysiloxane resin; (b) a photo acid generator; (c) a moisture cure catalyst; and (d) optionally, an epoxy functional diluent.

10 Claims, 2 Drawing Sheets

DUAL CURE COMPOSITION

FIELD OF THE INVENTION

The present invention relates to a dual cure composition containing epoxy-functionalized polysiloxanes.

INTRODUCTION

Light and moisture dual cure polysiloxane resin compositions are useful, for example, in coating, encapsulation, potting and adhesive applications where exposure of all portions of a coating to light is difficult yet rapid curing of the coating is desirable. The light cure mechanism facilitates a rapid cure of the composition when exposed to light. The moisture cure mechanism serves to cure portions of a composition blocked from exposure to light ("shadow areas"). Dual cure mechanisms are valuable in coatings to enable moisture curing to complete curing when light cannot access all areas of a coating.

Dual cure polysiloxane resin compositions can comprise (meth)acrylate-based curing systems. However, (meth)acrylate-based systems are sensitive to and inhibited by oxygen so inert conditions are necessary during curing, at least the composition surface. Providing the necessary inert atmosphere adds undesirable expense and complexity to a curing process.

Another dual cure polysiloxane resin composition relies on a "thiol-ene" reactive system for light triggered curing. Upon exposure to ultraviolet (UV) and/or visible light a thiol functionality reacts with and adds across a carbon-carbon unsaturated bond such as in a vinyl group. Typically, thiol-ene reactive systems comprise a photoinitiator for the light triggered curing reaction.

Dual cure polysiloxane resin compositions typically include a multi-functional alkoxysilane-based crosslinker in order to achieve rapid moisture curing of the formulation to form a strong coating with acceptable adhesion to substrates. The multiple alkoxy groups on the silane participate in moisture curing of the alkoxy silane to form a crosslinked structure that rapidly imparts skin formation on the composition. Generally, it is desirable to achieve a moisture cured skin within 4 hours or less after application of the formulation to a substrate when in an atmosphere of at least 60% relative humidity at 23 degrees Celsius (° C.). To simplify the composition of dual cure polysiloxane resin compositions, it is desirable to identify a dual cure polysiloxane resin composition that does not require multi-functional alkoxy silane-based components in order to moisture cure to form a skin within 4 hours of applying the dual cure polysiloxane resin composition to a substrate when exposed to an atmosphere of at least 60% relative humidity at 23° C.

Dual cure polysiloxane resin compositions also typically comprise a non-reactive organic solvent. The non-reactive organic solvent lowers the viscosity of the composition, thereby making the composition easier to apply to substrates. That is important when formulating with polysiloxane resins. Polysiloxane resins are typically solids or very high viscosity (greater than 26 Pascal*seconds (Pa*s)) liquids, which makes blending the composition components difficult as well as makes it difficult to apply the composition to a substrate. Unfortunately, non-reactive organic solvents remain as a contaminant, typically an extractable contaminant, within the polysiloxane resin composition even after curing. Therefore, it would be desirable to identify a dual cure polysiloxane resin composition that can be applied to substrates without requiring non-reactive organic solvent.

It is desirable to identify a dual cure polysiloxane resin composition that cures by both light and moisture to form cured polysiloxane resin composition but that does not require (meth)acrylate-based curing systems, thiol-ene reactive systems, alkoxysilane-based crosslinkers or non-reactive organic solvent to have a viscosity of 26 Pa*s or less or to cure by both UV light and moisture, with moisture cure skin formation within 4 hours of application when exposed to an atmosphere of at least 60% relative humidity at 23° C.

BRIEF SUMMARY OF THE INVENTION

The present invention provides a dual cure polysiloxane resin composition that cures by both light and moisture to form cured polysiloxane resin composition but that does not require (meth)acrylate-based curing systems, thiol-ene reactive systems, alkoxysilane-based crosslinkers or non-reactive organic solvent to be applied to a substrate or to cure. The present invention provides a composition that can undergo UV curing to form a tack-free non-liquid coating upon UV exposure of 0.5 Joule or more UV exposure, form a moisture cure skin within 4 hours of application when exposed to an atmosphere of at least 60% relative humidity at 23° C., and achieves adhesion rating of 3 in the herein described Adhesion to Glass test.

The present invention is a result of discovering that a polysiloxane resin having epoxy functional groups and on average 15 or more mole-percent hydroxyl and/or alkoxyl functional groups (jointly herein referred to as "OZ" groups) relative to silicon atoms is surprisingly both fluid enough to have a viscosity of 26 Pascal second (Pa*s) or less so it can be formulated without solvent to form a dual cure composition that can be applied easily to substrate, and can be cured by both light and moisture to form a cured polysiloxane resin composition with the stated cure and adhesion properties without requiring an alkoxysilane-based crosslinker, or any additional crosslinker.

In a first aspect, the present invention is a composition comprising: (a) a polysiloxane resin, wherein the polysiloxane resin comprises the following siloxane units: $[R_3SiO_{1/2}]$, $[(OZ)_qSiO_{(4-q)/2}]$ and at least one of $[(OZ)_tR^{EP}SiO_{(3-t)/2}]$ and $[(OZ)_dRR^{EP}SiO_{(2-d)/2}]$; where: each R is independently in each occurrence selected from hydrocarbyls, $R^{EP}$ is an epoxy functional hydrocarbyl group, subscript q is in each occurrence a number selected from a range of 0-3, subscript t is in each occurrence a number selected from a range of 0-2, and subscript d is in each occurrence a number selected from a range of 0-1 provided that the average concentration of OZ groups is at least 15 mole-percent relative to moles of silicon atoms in the polysiloxane resin; (b) a photo acid generator; (c) a moisture cure catalyst; and (d) optionally, an epoxy functional diluent.

In a second aspect, the present invention is a method for forming a cured polysiloxane resin, the method comprising the steps of: (a) providing the composition of the first aspect; (b) exposing the composition to ultraviolet light; and (c) exposing the composition to moisture.

The present inventive composition provides a light/moisture dual cure formulation that requires fewer components than other dual cure formulations yet produces a cured formulation having desired adhesive and strength properties.

DETAILED DESCRIPTION OF THE INVENTION

Figure 1:
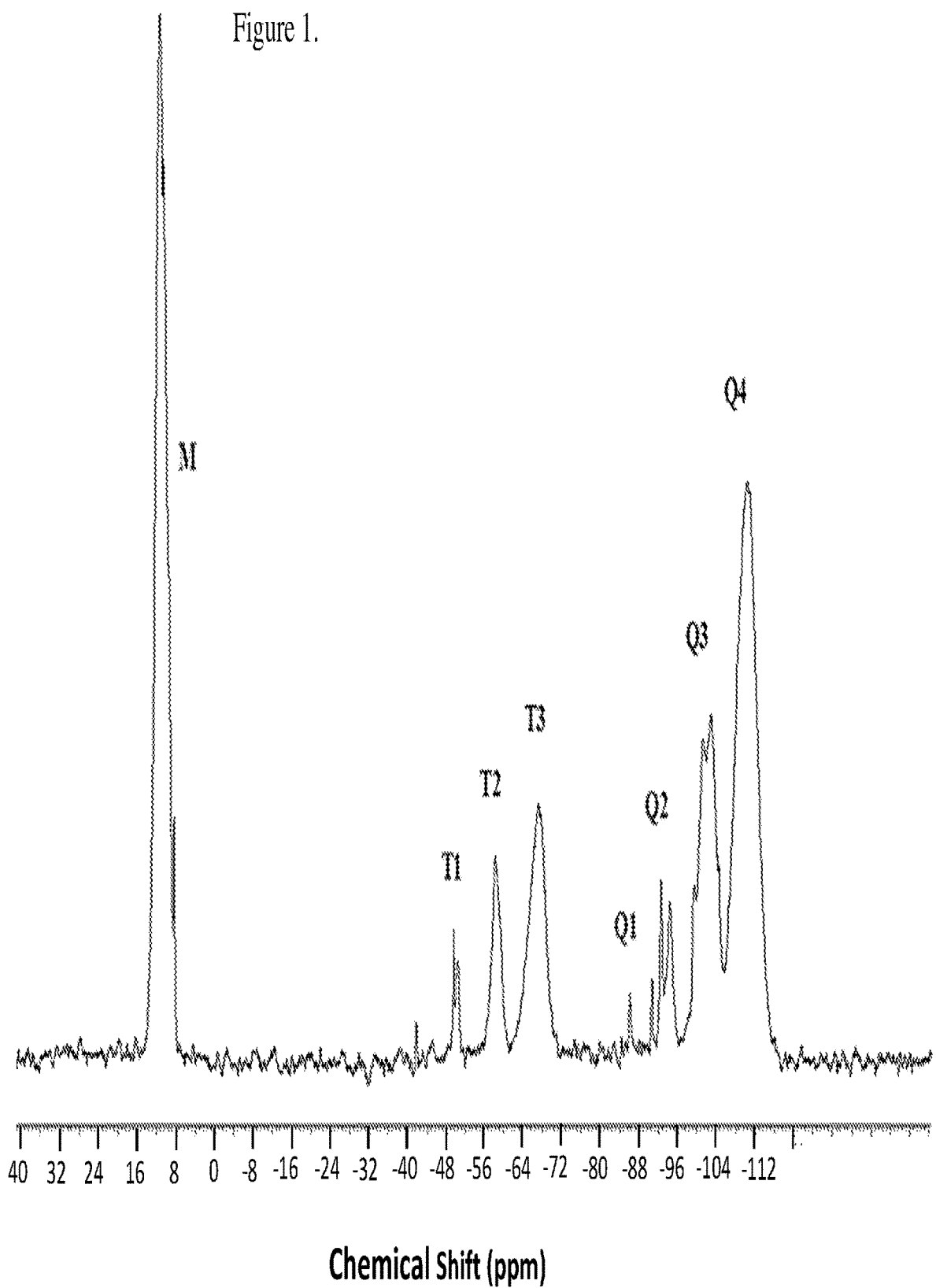
FIGS. 1 and 2 provide $^{29}Si$ nuclear magnetic resonance (NMR) spectra of Resins A and I, respectively, showing relative positions of siloxane units in a resin. The ppm shift values on the x-axis are relative to tetramethylsilane (TMS) and provide general guidance on absolute location of each unit, actual positions will depend on what groups are attached to and around the silicon of the siloxane unit.

Test methods refer to the most recent test method as of the priority date of this document when a date is not indicated with the test method number. References to test methods contain both a reference to the testing society and the test method number. The following test method abbreviations and identifiers apply herein: ASTM refers to ASTM International; EN refers to European Norm; DIN refers to Deutsches Institut für Normung; and ISO refers to International Organization for Standards.

"Multiple" means two or more. "And/or" means "and, or as an alternative". All ranges include endpoints unless otherwise indicated. Products identified by their tradename refer to the compositions available from the suppliers under those tradenames at the priority date of this document unless otherwise stated herein.

"Polysiloxane" refers to a polymer containing multiple siloxane bonds. Polysiloxanes comprise siloxane units that are selected from those known in the art as: $SiO_{4/2}$ ("Q" type), $RSiO_{3/2}$ ("T" type), $R_2SiO_{2/2}$ ("D" type), and $R_3SiO_{1/2}$ ("M" type). The subscript on the R group indicates how many R groups are bound to the silicon atom. The subscript on the oxygen indicates how many oxygens are bound to the silicon that are also bound to another silicon (that is, how siloxane linkages, "Si—O—Si" bonds, the silicon atom participates in) where the number is divided by 2 because the oxygen is shared with another silicon atom. Hence, a D-type unit comprises a silicon atom bound to two R groups and sharing two oxygens with other silicon atoms. In general, the R group can be any substituent other than —OSi (that is, a siloxane bond to the silicon). Generally, the R group is a hydrocarbyl bound to the silicon atom through a carbon-silicon bond. However, the R group in the broadest scope herein can also be a group bound to the silicon atom with an atom other than carbon, for instance sulfur or oxygen. For instance, the R group can be selected from hydroxyl or alkoxyl groups, which are jointly referred to as "OZ" groups.

"MQ resin" is one type of polysiloxane that contains M type and Q type siloxane units. An MQ resins can also comprise D and/or T type siloxane units unless otherwise stated.

"Hydrocarbyl" is a univalent radical derived from a substituted or non-substituted hydrocarbon. Substituted hydrocarbons have one or more than one hydrogen or carbon atom replaced with another atom or substituent. Herein, hydrocarbyl in each occurrence can be either substituted or non-substituted, corresponding respectively to hydrocarbyls derived from either a substituted or non-substituted hydrocarbon.

"Epoxy group" refers to a functional group that contains an oxygen atom joined by single bonds to two adjacent carbon atoms to form a three membered ring containing two carbon atoms and one oxygen atom.

"Light", in its broadest scope as used herein, refers to electromagnetic radiation. Preferably, light as used herein refers to visible and/or ultraviolet (UV) light.

"Non-reactive", as in non-reactive organic solvent, means that the material does not react with the other components of the composition during UV or moisture curing.

Molecular weight of resins is reported as weight-average molecular weight as determined by gel permeation chromatography (GPC). Details of the GPC procedure are in the Examples section, herein.

Determine viscosity of resins and compositions using a Brookfield Viscometer (model DV-E) according to the method of ASTM D2196.

The composition of the present invention comprises a polysiloxane resin, wherein the polysiloxane resin comprises, and can consist of, the following siloxane units: $[R_3SiO_{1/2}]$, $[(OZ)_qSiO_{(4-q)/2}]$ and at least one of $[(OZ)_tR^{EP}SiO_{(3-t)/2}]$ and $[(OZ)_dRR^{EP}SiO_{(2-d)/2}]$. The polysiloxane resin can contain both $[(OZ)_tR^{EP}SiO_{(3-t)/2}]$ and $[(OZ)_dRR^{EP}SiO_{(2-d)/2}]$ units, or can be free of either one as long it contains the other.

In the broadest scope of the invention, polysiloxane resin can comprise siloxane units other than $R_3SiO_{1/2}]$, $[(OZ)_qSiO_{(4-q)/2}]$ and at least one of $[(OZ)_tR^{EP}SiO_{(3-t)/2}]$ and $[(OZ)_d RR^{EP}SiO_{(2-d)/2}]$. For instance, the polysiloxane resin can further comprise $R_2SiO_{2/2}$ units (D type units) and/or $R_3SiO_{3/2}$ (T type units). It can be desirably to include D type units to impart linear characteristic to the resin, which generally decreases hardness of the cured composition as the concentration of the D type unit increases. In contrast, one desirable composition of the present invention provides a cured composition having a pencil hardness of 2H or harder. For such a hard coating it is desirable to keep the concentration of D type units in the polysiloxane resin to 10 mol % or less, preferably 5 mol % or less, even more preferably 2 mol % or less, one mol % or less or even 0.5 mol % or less on average with respect to total moles of siloxane units. The polysiloxane resin can be free of D type siloxane units to achieve greatest hardness in the cured composition.

Each R is independently in each occurrence selected from hydrocarbyls, preferably from non-substituted hydrocarbyls and more preferably from a group consisting of methyl, ethyl propyl, butyl and phenyl.

$R^{EP}$ is an epoxy functional hydrocarbyl group. For example, $R^{EP}$ can be an 3,4-epoxycyclohexyl)ethyl group; a 3,4-epoxycyclohexyl)propyl group; a 3-(2,3-epoxypropyoxy)propyl group (also known as a 3-glycidyloxypropyl group); a 3,5-epoxybutyl group; a 4,5-epoxypentyl group; a 5,6-epoxyhexyl group.

Subscript t is in each occurrence a number selected from a range of 0-2; subscript d is in each occurrence a number selected from a range of 0-1; and subscript q is in each occurrence a number selected from a range of 0-3; provided that the average concentration of OZ groups in the polysiloxane resin ("OZ content") is in a range as stated below.

OZ is independently in each occurrence a hydroxyl or alkoxyl group. Desirably, each OZ is independently in each occurrence selected from hydroxyl, methoxy, and ethoxy. Desirably, the polysiloxane resin comprises at methoxy and/or ethoxy groups. The OZ content is 15 mole-percent (mol %) or more, and can be 18 mol % or more, 20 mol % or more, 22 mol % or more, even 25 mol % or more, 30 mol % or more, 40 mole % or more, 50 mol % or more, 60 mol % or more, or 70 mol % or more. Increasing the OZ content generally increases the fluidity of the resin (lowers its viscosity) and increases the rate (decreases time required) for the composition to moisture cure to form a skin. Increasing OZ content also tends to increase glass adhesion. Therefore, higher OZ content is desirable to enhance those characteristics. In some applications, thermal stability of the resin may be important in which an upper limit to the OZ content will become important because thermal stability of the resin tends to decrease with increasing OZ content. It can be desirable for the polysiloxane resin to have a 5% weight-loss temperature (by thermal gravimetric analysis (TGA)) that is above 150 degrees Celsius (° C.). To achieve such a thermal stability it is desirable for the of OZ content to be, 80 mol % or less, preferably 60 mol % or less, more preferably 50 mol % or less, even more preferably 40 mol % or less, and can be 30 mol % or less, even 20 mol % or less. For avoidance of doubt, any of these upper limits on OZ content are intended to be combinable with any of the lower limits on OZ content previously stated to define preferred the OZ contents of the polysiloxane resin. Herein, OZ content is relative to moles of silicon atoms in the polysiloxane resin.

Figure 2:
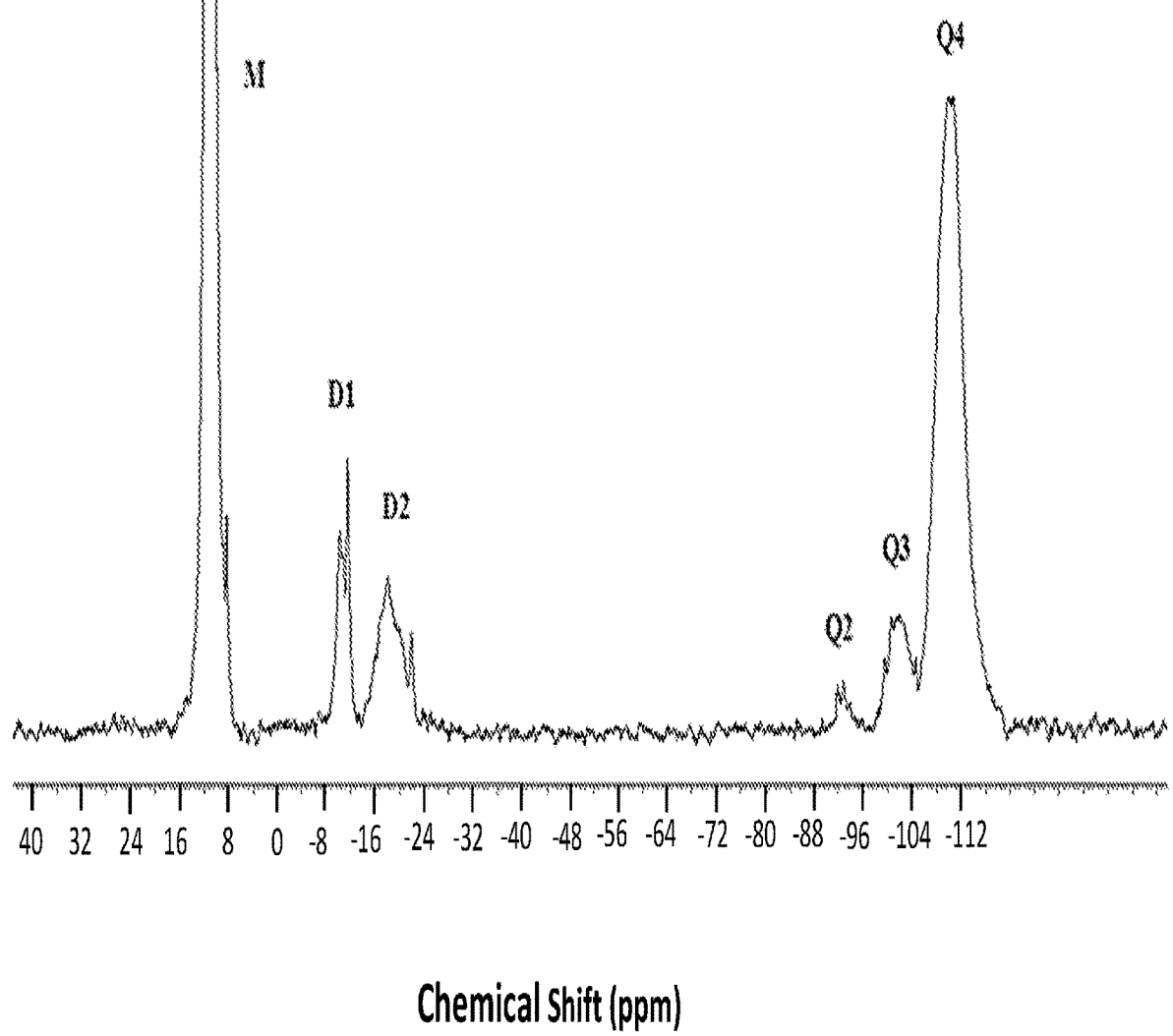

Determine OZ content using $^{29}$Si nuclear magnetic resonance spectroscopy ($^{29}$Si NMR). Conduct $^{29}$Si NMR of samples using a Varian XL-400 spectrometer. Reference chemical shifts to internal solvent resonance and are reported relative to tetramethylsilane. Each siloxane unit in the resin shows up in a unique position. Integration under the areas of the peaks allows calculation of the concentration of OZ groups relative to silicon atoms. FIGS. 1 and 2 illustrate exemplary $^{29}$Si NMR spectra for two polysiloxane resins using the Examples herein showing the general location of each siloxane unit relative to one another and with X-axis ppm values relative to tetramethyl silane (TMS). Peaks in the spectrum are labeled as to which siloxane unit they correspond to, with the labels being as follows:

M=$R_3SiO_{1/2}$
D1=$R_2(OZ)SiO_{1/2}$
D2=$R_2SiO_{2/2}$
T1=$R(OZ)_2SiO_{1/2}$
T2=$R(OZ)SiO_{2/2}$
T3=$RSiO3_{/2}$
Q1=$(OZ)_3SiO_{1/2}$
Q2=$(OZ)_2SiO_{2/2}$
Q3=$(OZ)SiO_{3/2}$
Q4=$SiO_{4/2}$

Determine OZ content relative to silicon atoms as a mol % using the following formula with the label for each peak in the formula corresponding to the integrated area under the peak corresponding to the label:

$$OZ \text{ content (mol \%)} = 100 \times \left( \frac{(D1 + 2 \times T1 + T2 + 3 \times Q1 + 2 \times Q2 + Q3)}{(M + D1 + D2 + T1 + T2 + T3 + Q1 + Q2 + Q3 + Q4)} \right)$$

Surprisingly, it has been discovered that the resin has a viscosity of 26 Pa*s or lower when the OZ content is 15 mol % or more relative to the polysiloxane. Polysiloxane resins typically contain less than 15 mol % OZ and tend to be solids. Solid, and high viscosity (greater than 26 Pa*s) polysiloxane resins generally require mixing with a solvent, generally an organic solvent, to form a liquid in order to formulate into a composition that can be applied as a liquid. Polysiloxane resins of the present invention do not require mixing with a solvent to form a liquid in order to formulate or form a composition than can be applied as a liquid. In fact, compositions of the present invention can be free of solvent, especially non-reactive solvents, while at the same time can be a liquid. Desirably, the compositions of the present invention are free of organic solvent and preferably free of solvent altogether.

The polysiloxane resin can be synthesized from epoxy functional alkoxy silanes and silanol functional resins using a base catalyzed reaction. Examples of such reaction are set forth in the Examples section below.

Desirably, the composition contains less than 5 weight-percent (wt %) and can contain 4 wt % or less, 3 wt % or less, 2 wt % or less, even one wt % or less of alkoxy functional silicon-containing components other than the polysiloxane resin, where wt % is relative to composition weight. The composition can be free of alkoxy functional silicon-containing components other than the polysiloxane resin.

The composition of the present invention further comprises a photo acid generator (PAG). PAGs become acidic upon exposure to light and, as such, act as photo initiators for acid catalyzed reactions. The present composition requires the PAG to achieve a rapid UV curing of the composition—that is, to achieve a composition that is tack-free to the touch (and not liquid) upon a 0.5 Joule exposure of UV radiation. PAGS typically become acidic by dissociating to form strong acids or dissociate protons upon exposure to light. One common type of PAG include triphenyl sulfonium salts. Examples of PAGs include bis(4-dodecylphenyl)iodonium hexafluoroantimonate; (p-dodecylphenyl)(p-methylphenyl)iodonium hexafluoroantimonate; (p-isopropylphenyl)(p-methylphenyl)iodonium tetrakis(pentafluorophenyl) borate; diphenyliodonium nitrate, diphenyliodonium hexafluorophosphate, (4-fluorophenyl)diphenylsulfonium triflate, N-hydroxynaphthalimide triflate, (4-iodophenyl)diphenylsulfonium triflate, (4-methoxyphenyl)diphenylsulfonium triflate, (4-phenoxyphenyl)diphenylsulfonium triflate, triarylsulfonium hexafluorophosphate, triphenyl sulfonium perfluoro-1-butanesulfanate, triphenyl sulfonium triflate, tris(4-tert-buity-phenyl)sulfonium perflulro-1-butanesulfonate, bis(4-tert-butylphenyl)iodonium perfluoro-1-butanesulfonate, and bis (4-tert-butylphenyl)iodonium p-toluenesulfonate.

PAGs are typically present in the composition at a concentration of 0.1 weight-percent (wt %) or more, 0.25 wt % or more, 0.5 wt % or more, 0.75 wt % or more, 1.0 wt % or more even 1.5 wt % or more while at the same time typically 3.0 wt % or less, 2.5 wt % or less, 2.0 wt % or less, 1.5 wt % or less and can be 1.0 wt % or less even 0.75 wt % or less with wt % relative to composition weight.

The composition further comprises a moisture cure catalyst. Moisture cure catalysts enhance the rate at which the alkoxysilyl groups on the polyorganosiloxane react with moisture to cure. Suitable moisture cure catalysts include any one or combination of more than one organo-metal catalysts selected from a group consisting of titanium compounds, tin compounds, and zirconium compounds. Desirably, the moisture cure catalyst is a titanium-based catalyst, tin-based catalyst, or a combination thereof. Examples of suitable titanium compounds include tetraisopropylorthotitanate; titanium diisopropoxide bis(ethylacetoacetate); tetraisopropyl titanoate; tetrabutoxyorthotitanate; di(isopropoxy)bis(ethylacetoacetate)titanium; di(isopropoxy)bis (methylacetoacetate)titanium; NS di(isopropoxy)bis (acetylacetonate)titanium. Examples of suitable tin compounds include dibutyltin dilaurate and dibutyltin dioctoate. Examples of suitable zirconium compounds include tetra(isopropoxy)zirconium, tetra(n-butoxy)zirconium, tetra (t-butoxy)zirconium, di(isopropoxy)bis(ethylacetoacetate) zirconium, di(isopropoxy)bis(methylacetoacetate)zirconium, and di(isopropoxy)bis(acetylacetonate)zirconium.

Typically, the concentration of moisture cure catalyst is 0.1 wt % or more, 0.5 wt % or more, one wt % or more, 2 wt % or more, and even 3 wt % or more while at the same time is generally 3 wt % or less, 2 wt % or less or even one wt % or less relative to composition weight.

The composition can optionally comprise an epoxy functional diluent ("reactive diluent"). The epoxy functional diluent can be useful to reduce the viscosity of the composition. However, the epoxy functionality enables the diluent to participate in the curing of the composition and, as a result, becomes bound to the cured resin rather than remaining as an extractable component like non-reactive solvents. The epoxy functional diluent can have on average one or more, preferably two or more epoxy functionalities per molecule. Examples of suitable epoxy functional diluents include anyone or combination of more than one selected from a group consisting of 3,4-epoxycyclohexylmethyl 3,4-epoxycyclohexanecarboxylate; resorcinol diglydicyl ether; dicylclopentadiene dioxide; and neopentyl glycol diglycidyl ether. Reactive diluent is typically present at a concentration of less than 30 wt %, more typically 15 wt % or less relative to composition weight.

The composition can further comprise, or be free of, any one or any combination of more than one additional additive. Additional additives include pigments, colorants, electrically conductive fillers (such as metal powder and metal flake), thermally insulating fillers, adhesion promoters and dispersing aids.

The composition of the present invention is particularly advantageous because the polysiloxane resin is a liquid with a viscosity of 26 Pa*s or less so the composition itself is a liquid without requiring any additional components (particularly liquid components) beyond the polysiloxane resin, the photo acid generator, the moisture cure catalyst and reactive diluent. The composition can contain less than 30 wt %, preferably 20 wt % or less, 10 wt % or less, 5 wt % or less, 1 wt % or less and even can be free of liquid components other than the polysiloxane resin, the photo acid generator, the moisture cure catalyst, and reactive diluent—and at the same time the composition can itself be a liquid.

The composition can be free of silane and/or polysilane having multiple OZ groups on a single molecule, and can be free of silane and/or polysilane molecules altogether. While any or all of the options for this composition as described herein can be combined in any way, one particularly desirable composition is free of silane or polysilane having multiple hydroxyl or alkoxy groups on a single molecule, or free of organic solvent, or free of both silane or polysilane having multiple hydroxyl or alkoxy groups on a single molecule and is also free of organic solvent. Even when the composition is free of silane and/or polysilane having multiple OZ groups the composition can moisture cure to form a skin within 4 hours in an atmosphere of at least 60% relative humidity at 23° C.

The composition of the present invention is useful as a dual cure composition that can be cured to form a cured polysiloxane resin by exposure to light and or moisture. Beneficially, the composition can be cured by both light and moisture to allow rapid curing of exposed portions of the composition with light while further allowing curing of non-exposed portions of the composition by moisture. The composition is particularly useful for as a curable coating filling agent.

The method of dual curing the composition of the present invention to form a cured polysiloxane resin requires providing the composition and then exposing the composition to light, typically ultraviolet light, and exposing the composition to moisture. The order of exposing the composition to light and moisture is not critical and can actually occur simultaneously. Typically, the composition is first exposed to light and then allowed to moisture cure.

Desirably, the method of forming a cured polysiloxane resin from the composition of the present invention further includes applying the composition to a substrate prior to exposing the composition to light. A beneficial aspect of the present invention is that the composition is that it is a liquid and can be applied as a liquid without requiring solvents or liquid components other than the polysiloxane resin. That makes the composition easy to apply and enables the composition to be solvent-free without requiring removal of solvent after applying to a substrate. Hence the cured composition can be applied as a liquid, cured to a cured polysiloxane resin and, without having to remove anything from the cured composition, is free of extractable liquid components in the coating.

EXAMPLES

Characterization of Epoxy Functionalized Resins

Determine resin viscosity using a Brookfield Viscometer (model DV-E) according to the method of ASTM D2196.

Characterize the resin for thermal stability use thermal gravimetric analysis (TGA) in a TA Instruments Q50 device. Place 14-20 milligrams of resin sample into a platinum pan and heat using the following profile: ramp from 23° C. to 900° C. at 10° C. per minute under a 60 milliliter per minute nitrogen purge (purge the balance with nitrogen at 40 milliliters per minute). Determine the temperature at which the sample loses 5% of its weight and that is the 5% Wt-Loss Temp.

Determine molecular weight for the resins using gel permeation chromatography using a Waters 2695 Separation Module with a vacuum degasser and a Waters 410 differential refractometer. Use two (300 millimeter by 7.5 millimeter) Polymer Laboratories PLgel 5 micrometers Mixed-C columns (molecule weight separation range of 200-2,000,000), preceded by a PLgel 5 micrometer guard column (50 millimeters by 7.5 millimeters). Use certified grade tetrahydrofuran (THF) flowing at 1.0 milliliters per minute as the eluent while maintaining the column and detector at 35° C. Prepare samples in THF at approximately 0.15 volume-percent concentration and allow to solvate for three hours with occasional shaking and filter through a 0.45 micrometer polytetrafluoroethylene syringe filter prior to analysis. Inject 100 microliters of sample for analysis and collect data for 25 minutes. Collect data and conduct analysis using Thermo-Labsystems Atlas chromatography software and Polymer Laboratories Cirrus GPC software. Molecular weight averages are relative to a calibration curve ($3^{rd}$ order) created suing polystyrene standards covering the molecular weight range of 580 to 2,300,000.

Synthesis of Epoxy Functionalized Resins

Resin A—$MT^{CHEp}Q$ Resin

Add to a 3-liter (3-L) flask equipped with a magnetic stir-bar 800 grams (g) of toluene, 500 g of a polysiloxane resin powder having an average composition of $((CH_3)_3SiO_{1/2})_{43.2}(HOSiO_{3/2})_{11.5}(SiO_{4/2})_{45.3}$ (commercially available as DOWSIL™ MQ-1600, DOWSIL is a trademark of The Dow Chemical Company). Add 337 g of 2-(3,4-epoxycyclohecyl)ethyl trimethoxysilane (available from Gelest, Inc. and Sigma-Aldrich) and 0.82 g of potassium hydroxide. Stir and heat at reflux (internal reaction temperature of 70° C.) under nitrogen. Monitor the reaction mixture by gas chromatography for presence of the silane. Once the silane is consumed (approximately 4 hours) cool the reaction mixture to 23° C. and then add 4.1 g of acetic acid. Stir the reaction mixture for one hour. Filter the reaction mixture through a one-micron filter to obtain a clear fluid. Remove volatiles using a roto-vap to obtain a clear liquid resin. Analysis by $^{29}$Si NMR indicates the resin has an average concentration of each siloxane unit relative to total siloxane units as follows: 31.68 mol % M, 1.56 mol % T1, 5.05 mol % T2, 10.10 mol % T3, 0.43 mol % Q1, 3.44 mol % Q2, 15.71 mol % Q3, 31.89 mol % Q4. The R group on the T1, T2 and T3 units comprise is 2-(3,4-epoxycyclohexyl)ethyl so as together to form "$T^{CHEp}$" units. The reaction characteristic and resin characteristics are included in Table 1.

Resins B-G: $MT^{CHEp}Q$ with Various Levels of OZ and Molecular Weight.

Add to a 3-liter (3-L) flask equipped with a magnetic stir-bar 800 grams (g) of toluene, 500 g of the polysiloxane polysiloxane resin powder used in making Resin A, 337 g of 2-(3,4-epoxycyclohexyl)ethyl trimethoxysilane and 0.82 g of potassium hydroxide. Stir and reflux (internal temperature of 70° C.) under nitrogen until all silane is consumed, as determined by gas chromatography. Add 12.3 g of water in 20 g of methanol. Attach a Dean-Stark head to the flask. Stir the mixture and heat, collecting volatiles in the Dean-Stark trap. Replace the volume of volatiles collected with toluene continue heating to the Internal Temp and for the Reaction Time stated in Table 1. Cool the reaction mixture to 23° C. and neutralize with acetic acid. Filter the reaction mixture through a one-micron filter to obtain a clear liquid. Remove volatiles from the liquid using a roto-vap to obtain the resulting liquid resin. Analyze by $^{29}$Si NMR and $^{13}$C NMR (reveals epoxy present) as well as for thermal stability. Internal Reaction Temps and Reaction times are in Table 1 along with resulting resin characteristics.

Resin H: $MT^{Ep}Q$

Add to a 3-literflask equipped with a magnetic stir-bar 800 grams of toluene and 500 grams of the polysiloxane resin powder used to make Resin A. Add 325 grams of (3-glycidoxypropyl) trimethoxysilane and 0.82 g of potassium hydroxide and stir the mixture at 100° C. under nitrogen while monitoring the reaction mixture using gas chromatography. After 5 hours cool the reaction to 23° C. and add 4.1 g of acetic acid and stir for one hour. Filter the solution through a one-micrometer filter to obtain a clear liquid. Remove volatiles form the clear liquid using a roto-vap to obtain a clear liquid resin (Resin H). Analyze by $^{29}$Si NMR and $^{13}$C NMR as well as for thermal stability $^{13}$C NMR indicates the epoxy ring is intact. $^{29}$Si NMR indicates the resin has an average concentration of each siloxane unit relative to total siloxane units as follows: 31.42 mol % M, 1.40 mol % T1, 4.63 mol % T2, 10.56 mol % T3, 0.21 mol % Q1, 3.44 mol % Q2, 14.76 mol % Q3, 33.59 mol % Q4. The R group on the T1, T2 and T3 units is glycidoxypropyl so as together to form "$T^{Ep}$" units. The reaction characteristic and resin characteristics are included in Table 1.

Resins I: $MD^{Ep}Q$

Add to a 100 milliliter flask equipped with a magnetic stir-bar 25 grams of toluene and 14.7 grams of polysiloxane resin powder used in making Resin A. Add 8.8 grams of (3-glycidoxypropyl) trimethoxysilane and 0.16 grams of potassium hydroxide. Stir and heat the mixture at reflux (internal reaction temperature of 70° C.) under nitrogen while monitoring the reaction mixture by gas chromatography. After 8 hours cool the mixture to 50° C. and add 0.2 grams of acetic acid and stir for one hour as it cools to 23° C. Filter the solution through a one-micrometer filter to obtain a clear liquid. Remove volatiles form the clear liquid by roto-vap to obtain a clear liquid resin (Resin I). Analyze by $^{29}$Si NMR and $^{13}$C NMR as well as for thermal stability $^{13}$C NMR indicates the epoxy ring is intact. $^{29}$Si NMR indicates the polysiloxane resin powder has an average concentration of each siloxane unit relative to total siloxane units as follows: 36.3 mol % M, 5.28 mol % D1, 7.53 mol % D2, 0.00 mol % Q1, 1.62 mol % Q2, 8.10 mol % Q3, 41.18 mol % Q4. The R group on the D land D2 units is glycidoxypropyl so as together to form "$D^{Ep}$" units. The reaction characteristic and resin characteristics are included in Table 1.

Resins J-M: $MT^{CHEp}Q$ with Various Levels of OZ and Molecular Weight.

Prepare Resins J-M using the following procedure and by selecting the type and amount of epoxy functional silane reactant as follows: Resin J (646.6 g of 3-glycidoxypropyl) trimethoxysilane); resin K (977.5 g of 2-(3,4-epoxycyclohexl)ethyl methyldimethoxysilane); Resin L (811.8 g of 3-glycidoxypropyl)trimethoxysilane); resin M (846.3 g of 2-(3,4-epoxycyclohexl)ethyl methyldimethoxysilane).

Add to a 3-liter flask equipped with a magnetic stir-bar 800 grams of toluene and 500 grams of polysiloxane resin powder used in making Resin A. Add the epoxy-functional silane for the desired resin as stated above and 1.15 g of potassium hydroxide. Stir the mixture at reflux (approximately 70° C.) while monitoring reaction progress using gas chromatography. After the silane is completely consumed (approximately 3 hours) cool the mixture to 23° C. and add 5.8 grams of acetic acid and stir for one hour. Filter the mixture through a one-micrometer filter to obtain a clear liquid. Remove volatiles from the clear liquid using a roto-vap. Analyze by $^{29}$Si NMR and $^{13}$C NMR as well as for thermal stability $^{13}$C NMR indicates the epoxy ring is intact. $^{29}$Si NMR indicates the resin has an average concentration of each siloxane unit relative to total siloxane units as follows. The R group on the T units is glycidoxypropyl for Resins J and L, and 2-(3,4-epoxycyclohexyl)ethyl for Resins K and M. The reaction characteristic and resin characteristics are included in Table 1.

The data reveals that the same epoxy functionality, increasing OZ content results in lower viscosity resin and lower 5% Wt Loss temperature (decreased thermal stability). This is most easily seen in the series of Resins A-G which all have the same epoxy functionality.

TABLE 1

| Resin | Reaction Time (hours) | Internal Reaction Temp (° C.) | Molecular Weight (g/mol) | Viscosity (Pa * s) | Mol % M units[1] | Mol % Epoxy-Functional Siloxane Units[1] | Mol % Q units[1] | Mol % OZ[2] | 5% Wt-Loss Temp (° C.) |
|---|---|---|---|---|---|---|---|---|---|
| A | 4 | 70 | 4464 | 20 | 31.71 | 16.71 | 51.58 | 32.12 | 289 |
| B | 6 | 97 | 3020 | 20 | 30.88 | 16.73 | 52.39 | 30.82 | 298 |
| C | 8 | 97 | 3338 | 22 | 30.37 | 16.50 | 53.13 | 23.74 | 314 |

TABLE 1-continued

| Resin | Internal Reaction Time (hours) | Internal Reaction Temp (° C.) | Molecular Weight (g/mol) | Viscosity (Pa * s) | Mol % M units[1] | Mol % Epoxy-Functional Siloxane Units[1] | Mol % Q units[1] | Mol % OZ[2] | 5% Wt-Loss Temp (° C.) |
|---|---|---|---|---|---|---|---|---|---|
| D | 10 | 97 | 4700 | 25 | 30.69 | 16.83 | 52.48 | 19.23 | 338 |
| E | 12 | 97 | 6910 | 26 | 31.06 | 16.75 | 52.19 | 15.37 | 363 |
| F | 16 | 105 | 8540 | >26 | 30.98 | 16.65 | 52.23 | 11.23 | 375 |
| G | 24 | 110 | 10635 | >26 | 31.02 | 16.48 | 52.89 | 6.62 | 387 |
| H | 5 | 70 | 3800 | 17 | 31.42 | 16.59 | 52.00 | 29.69 | Not Measured |
| I | 8 | 70 | 2700 | 7 | 36.30 | 12.81 | 50.90 | 16.62 | Not Measured |
| J | 3 | 70 | 4450 | 0.284 | 20.44 | 30.49 | 49.07 | 67.36 | 215 |
| K | 3 | 70 | 1860 | 0.696 | 23.90 | 29.46 | 46.63 | 66.87 | 250 |
| L | 3 | 70 | 2850 | 0.108 | 19.10 | 34.23 | 46.68 | 73.26 | 188 |
| M | 3 | 70 | 1720 | 0.540 | 21.30 | 33.15 | 45.55 | 72.88 | 217 |

[1] Mol % M, Q and epoxy-functionalized siloxane units are relative to total moles of siloxane units.
[2] Mol % 0 Z is relative to moles of silicon atoms.

Dual Cure Compositions
Preparation of Dual Cure Compositions

Table 3 contains formulation information for each of the sample compositions. Prepare 100 gram samples of the compositions by combining the specified wt % of epoxy functional resin, PAG, moisture cure catalyst and reactive diluent together in an amber dental-mixer cup. Mix the combination of components with a dental mixer to form a well-blended composition. Proceed with the following UV curing and Moisture Curing steps for each of the samples.

The epoxy-functionalized resins are selected from those described above. The other components are selected from those in Table 2:

TABLE 2

| Component | Identify | Description | Source |
|---|---|---|---|
| PAG | PAG1 | bis(4-dodecylphenyl)iodonium hexafluoroantimonate) | Commercially available as SILFORCE ™ UV9390C from Momentive. |
| | PAG2 | (p-isopropylphenyl)(p-methylphenyl)iodonium tetrakis(pentafluorophenyl) borate | Gelest |
| | PAG3 | (p-dodecylphenyl)(p-methylphenyl)iodonium hexafluoroanimate | Obtainable from Hampford Research, Inc. |
| Moisture Cure Catalyst | MCC1 | Tetraisopropyl titanate | Commercially available as TYZOR ™ TPT from Sigma-Aldrich. |
| | MCC2 | Titanium diisopropoxide bis(ethylacetoacetate); "TDIDE" | Gelest |
| Reactive Diluent | RD1 | Bis[2-(3,4-epoxycyclohecyl)ethyl]-tetramethyldisiloxane | Gelest |

TABLE 3

| Sample | Epoxy Functionalized Resin (wt %) | PAG (wt %) | Moisture Cure Catalyst (wt %) | Reactive Diluent (wt %) |
|---|---|---|---|---|
| 1 | A (98.0) | PAG1 (1.0) | MCC1 (1.0) | N/A (0)[1] |
| 2 | A (99.0) | PAG1 (1.0) | N/A (0) | N/A (0) |
| 3 | A (99.0) | N/A (0) | MCC1 (1.0) | N/A (0) |
| 4 | A (49.0) | PAG1 (1.0) | MCC1 (1.0) | RD1 (49.0) |
| 5 | A (49.0) | PAG1 (1.0) | N/A (0) | RD1 (50.0) |
| 6 | A (49.0) | N/A (0) | MCC1 (1.0) | RD1 (50.0) |
| 7 | C (98.0) | PAG1 (1.0) | MCC1 (1.0) | N/A (0)[1] |
| 8 | E (98.0) | PAG1 (1.0) | MCC1 (1.0) | N/A (0)[1] |
| 9 | F (98.0) | PAG1 (1.0) | MCC1 (1.0) | N/A (0)[1] |
| 10 | G (98.0) | PAG1 (1.0) | MCC1 (1.0) | N/A (0)[1] |
| 11 | F (49.0) | PAG1 (1.0) | MCC1 (1.0) | RD1 (50.0) |
| 12 | G (49.0) | PAG1 (1.0) | MCC1 (1.0) | RD1 (50.0) |
| 13 | H (98.0) | PAG1 (1.0) | MCC1 (1.0) | N/A (0)[1] |
| 14 | I (98.0) | PAG1 (1.0) | MCC1 (1.0) | N/A (0)[1] |
| 15 | H (49.0) | PAG1 (1.0) | MCC1 (1.0) | RD1 (50.0) |
| 16 | I (49.0) | PAG1 (1.0) | MCC1 (1.0) | RD1 (50.0) |
| 17 | A (49.0) | PAG2 (1.0) | N/A (0)[1] | RD1 (50.0) |
| 18 | A (49.0) | PAG2 (1.0) | MCC2 (1.0) | RD1 (49.0) |
| 19 | A (49.0) | PAG2 (1.0) | MCC1 (1.0) | RD1 (49.0) |
| 20 | A (49.0) | PAG3 (1.0) | N/A (0)[1] | RD1 (50.0) |
| 21 | A (49.0) | PAG3 (1.0) | MCC1 (1.0) | RD1 (49.0) |
| 22 | H (49.0) | PAG2 (1.0) | N/A (0)[1] | RD1 (50.0) |
| 23 | H (49.0) | PAG2 (1.0) | MCC1 (1.0) | RD1 (49.0) |
| 24 | H (49.0) | PAG2 (1.0) | MCC2 (1.0) | RD1 (49.0) |

TABLE 3-continued

| Sample | Epoxy Functionalized Resin (wt %) | PAG (wt %) | Moisture Cure Catalyst (wt %) | Reactive Diluent (wt %) |
|---|---|---|---|---|

[1]"N/A (0)" means the component was not included in the formulation.

Characterization of Dual Cure Compositions

Characterize the samples using the following characterization methods. Table 4 contains the results of those characterizations.

Ultraviolet (UV) Curing. Coat a composition onto a glass substrate using a draw-down bar for a 250 micrometer thick coating. Immediately cure under UV radiation (0.15 Joule dosage broadband) at 23° C. using a Fusion Systems Corporation instrument model 31983-E. Expose samples to 0.5 Joules of UV radiation. After exposure if the sample is liquid or tacky to the touch, it "fails". If it is non-liquid and non-tacky to the touch, it "passes".

Moisture Curing. Moisture cure samples directly after UV curing, or on a coating prepared for UV coating but not UV cured if no UV curing is to be done, by placing the coated glass substrate in an environment at 23° C. and 60% relative humidity. Record the time it takes for the sample to form a skin ("Skin Cure Time"). To be acceptable, or to "pass", the sample needs to have a Skin Cure Time of 4 hours or less.

Composition Viscosity. Determine composition viscosity using a Brookfield Viscometer (model DV-E) according to the method of ASTM D2196.

Pencil Hardness. Measure Pencil Hardness according to ASTM D3363-05. Measure Pencil Hardness on samples after moisture curing for 6 days or, if the sample was not moisture cured, one hour after UV curing. A pencil hardness of 2H or harder is required to pass.

Adhesion to Glass. Measure adhesion strength to glass using a crosshatch adhesion test on samples that were both UV cured and moisture cured at 60% relative humidity at 23° C. for 6 days according to ASTM method D3359 using a Gardco PA-2000 adhesion test kit. Poor adhesion (rating of 1) means coating over 50% of the coated area was removed. Fair adhesion (rating of 2) means coating over 5-50% of the coated area was removed. Good adhesion (rating of 3) means coating over less than 5% of the coated area was removed.

TABLE 4

| Sample | Viscosity (Pa*s) | UV Cure (Pass/Fail) | Skin Cure Time (hours) | Pencil Hardness | Adhesion to Glass rating |
|---|---|---|---|---|---|
| 1 | 20 | Pass | 1.0 | 6H | 3 |
| 2 | 20 | Pass | >6 days | 6H | 1 |
| 3 | 20 | Fail | 1.0 | 2H | 3 |
| 4 | 0.45 | Pass | 1.0 | 4H | 3 |
| 5 | 0.45 | Pass | >6 days | 4H | 1 |
| 6 | 0.45 | Fail | 1.0 | 1H | 3 |
| 7 | 22 | Pass | 1.5 | 6H | 3 |
| 8 | 26 | Pass | 3.5 | 6H | 3 |
| 9 | >26 | Pass | 8.0 | 2H | 2 |
| 10 | >26 | Pass | >2 days | 1H | 1 |
| 11 | 0.73 | Pass | 12 | 2H | 2 |
| 12 | 0.85 | Pass | >2 days | 1H | 1 |
| 13 | 17 | Pass | 1.0 | 6H | 3 |
| 14 | 7 | Pass | 4.0 | 2H | 3 |
| 15 | 0.30 | Pass | 1.5 | 3H | 3 |
| 16 | 0.25 | Pass | 2.0 | 3H | 3 |
| 17 | 0.45 | Pass | >6 days | 6H | 1 |
| 18 | 0.45 | Pass | 3 | 5H | 3 |
| 19 | 0.45 | Pass | 2 | 5H | 3 |
| 20 | 0.45 | Pass | >6 days | 4H | 1 |
| 21 | 0.45 | Pass | 1 | 4H | 3 |
| 22 | 0.30 | Pass | >6 days | 6H | 1 |
| 23 | 0.30 | Pass | 3 | 4H | 3 |
| 24 | 0.30 | Pass | 6 | 2H | 3 |

Requirement for Catalysts. Samples 1-6 reveal the need for both the PAG and the moisture cure catalyst in the composition of the present invention. Samples 2 and 5 illustrate that when the moisture cure catalyst is absent a skin fails to form within 6 days, let alone the desired 4 hours or less and adhesion to glass is poor. Samples 3 and 6 illustrate that when the PAG is absent from the composition the composition fails the UV cure test. Samples 1 and 4 illustrate that the same compositions containing both the PAG and moisture cure catalyst pass the UV cure test, have a Skin Cure time of less than 4 hours and achieves good adhesion to glass. Samples 1-3 illustrate this performance in an absence of reactive diluent while Samples 4-6 illustrate these results in the presence of a reactive diluent.

Effect of OZ Content. Samples 1, 4 and 7-12 illustrate the effect of OZ content in compositions with and without reactive diluent. As a general trend, the samples reveal that decreasing OZ content results in higher viscosity compositions and longer Skin Cure Time. The data also reveals that when the OZ content is less than 15 mol % the composition viscosity is greater than 26 Pa*s and the Skin Cure Time exceeds 4 hours; yet, when the OZ content is 15 mole % or more the composition viscosity is 26 Pa*s or less and the Skin Cure Time is 4 hours or less. Samples 1 and 7-10 reveal these observations for compositions free of reactive diluent, while Samples 8, 11 and 12 reveal these observations for composition containing reactive diluent.

Different epoxy functionality, PAGs and moisture cure catalyst. Samples 13-24 demonstrate composition performance consistent with the previous observations using a variety of different epoxy functionality on the epoxy-functionalized resin, different PAGs and different moisture cure catalysts.

What is claimed is:

1. A composition comprising:
   (a) a polysiloxane resin, wherein the polysiloxane resin comprises the following siloxane units: $[R_3SiO_{1/2}]$, $[(OZ)_qSiO_{(4-q)/2}]$ and at least one of $[(OZ)_tR^{EP}SiO_{(3-t)/2}]$ and $[(OZ)_dRR^{EP}SiO_{(2-d)/2}]$; where: each R is independently in each occurrence selected from hydrocarbyls, $R^{EP}$ is an epoxy functional hydrocarbyl group, subscript q is in each occurrence a number selected from a range of 0-3, subscript t is in each occurrence a number selected from a range of 0-2, and subscript d is in each occurrence a number selected from a range of 0-1 provided that the average concentration of OZ groups is at least 15 mole-percent relative to moles of silicon atoms in the polysiloxane resin;
   (b) a photo acid generator;
   (c) a moisture cure catalyst; and
   (d) optionally, an epoxy functional diluent;
   where, OZ is independently in each occurrence a hydroxyl or alkoxy group.

2. The composition of claim 1, wherein the composition contains less than 30 wt % liquid components other than (a), (b) and (c) based on composition weight.

3. The composition of claim 1, wherein the composition contains less than 5 weight-percent based on composition weight of alkoxy functional silicon-containing species other than the polysiloxane resin component (a).

4. The composition of claim 1, wherein the polysiloxane resin comprises at least 15 mole-percent relative to resin silicon atoms of alkoxy groups selected from a group consisting of methoxy, ethoxy and combinations thereof.

5. The composition of claim 1, wherein the $R^{EP}$ groups that are substituted hydrocarbyl groups having epoxy functionalities are selected from a group consisting of 3-glycidoxypropyl groups, 2-(3,4-epoxycyclohexyl)ethyl groups, and combinations thereof.

6. The composition of claim 1, wherein the photoacid generator is present at a concentration in a range of 0.1 to 3.0 weight-percent of the composition.

7. The composition of claim 1, wherein the composition is free of silane or polysilane having multiple hydroxyl or alkoxy groups on a single molecule, or free of organic solvent, or free of both silane or polysilane having multiple hydroxyl or alkoxy groups on a single molecule and is also free of organic solvent.

8. The composition of claim 1, wherein the polysiloxane resin contains 10 mole-percent or less of D type siloxane units relative to total moles of siloxane units.

9. A method for forming a cured polysiloxane resin, the method comprising the steps of:
(a) providing the composition of claim 1;
(b) exposing the composition to ultraviolet light; and
(c) exposing the composition to moisture.

10. The method of claim 9, further comprising applying the composition onto a substrate prior to step (b).

* * * * *